US012140319B2

(12) United States Patent
Ballesteros et al.

(10) Patent No.: US 12,140,319 B2
(45) Date of Patent: Nov. 12, 2024

(54) ECCENTRIC KNOB ASSEMBLY FOR GAS APPLIANCES

(71) Applicant: WHIRLPOOL CORPORATION, Benton Harbor, MI (US)

(72) Inventors: Javier M. Ballesteros, Joinville (BR); Rodrigo Schultz, Joinville (BR); Rodrigo Tamanini, Joinville (BR)

(73) Assignee: WHIRLPOOL CORPORATION, Benton Harbor, MI (US)

(*) Notice: Subject to any disclaimer, the term of this patent is extended or adjusted under 35 U.S.C. 154(b) by 0 days.

(21) Appl. No.: 18/114,540

(22) Filed: Feb. 27, 2023

(65) Prior Publication Data
US 2024/0288174 A1  Aug. 29, 2024

(51) Int. Cl.
*F24C 3/12* (2006.01)
*F16K 31/528* (2006.01)

(52) U.S. Cl.
CPC ............ *F24C 3/126* (2013.01); *F16K 31/528* (2013.01); *F24C 3/122* (2013.01)

(58) Field of Classification Search
CPC ......... F16K 31/528; F24C 3/124; F24C 3/122
See application file for complete search history.

(56) References Cited

U.S. PATENT DOCUMENTS

| | | | | |
|---|---|---|---|---|
| 2,661,732 A * | 12/1953 | O'Keefe | ................ | F24C 3/124 126/39 R |
| 2,849,891 A * | 9/1958 | Mills | ........................ | G05G 1/10 74/504 |
| 3,767,880 A * | 10/1973 | Austin | ................... | H01H 19/03 200/336 |
| 5,269,343 A | 12/1993 | Trapp | | |
| 5,410,778 A | 5/1995 | Langevin | | |
| 5,509,174 A * | 4/1996 | Worrell | .................... | G05G 1/08 292/347 |
| 6,364,229 B1 | 4/2002 | Kang | | |
| 8,282,390 B2 * | 10/2012 | Albizuri | ................. | F24C 3/124 251/91 |
| 2017/0351292 A1* | 12/2017 | Stoufer | .................... | G05G 5/04 |
| 2018/0301301 A1* | 10/2018 | Bach | ....................... | F24C 7/082 |
| 2019/0025870 A1* | 1/2019 | Swayne | .................. | G05G 1/08 |
| 2020/0033905 A1* | 1/2020 | Swayne | ................. | G05G 5/005 |

(Continued)

FOREIGN PATENT DOCUMENTS

| | | | |
|---|---|---|---|
| CN | 1178336 A | * | 4/1998 |
| CN | 204063153 U | * | 12/2014 |
| DE | 3417612 A1 | * | 11/1985 |

(Continued)

OTHER PUBLICATIONS

Innova Systems, Solidworks 3D, "How to lock the rotation of cylindrical components," https://www.youtube.com/watch?v=AgQ2MqSvwWQ (2016).

(Continued)

*Primary Examiner* — Daniel D Yabut
(74) *Attorney, Agent, or Firm* — PRICE HENEVELD LLP

(57) ABSTRACT

An eccentric knob assembly is coupled to a gas valve of a gas appliance. The cooking surface of the gas appliance has an arcuate opening space away from the gas valve. The gas valve can be actuated by rotation of an actuator pin positioned in the arcuate opening that is connected to the knob and the gas valve.

19 Claims, 5 Drawing Sheets

(56) References Cited

U.S. PATENT DOCUMENTS

2020/0300475 A1* 9/2020 Ibrahim ................ G05G 1/082

FOREIGN PATENT DOCUMENTS

| EP | 2272334 | | 1/2011 |
|----|---------|---|--------|
| FR | 748804 A | * | 7/1933 |
| WO | 2010091801 | | 8/2010 |

OTHER PUBLICATIONS

"ART-13 Line Shaft Maintenance Crank," The Wayback Machine—http://web.archive.org/web/20130525071301/http://aafradio.org/garajmahal/ART-13_lineshaft_crank.html (Dec. 24, 2021).
Elesa USA Corporation, "Crank Handle," Twinsburg, OH, https://www.elesa.com/en/elesab2bstoreus (undated).

* cited by examiner

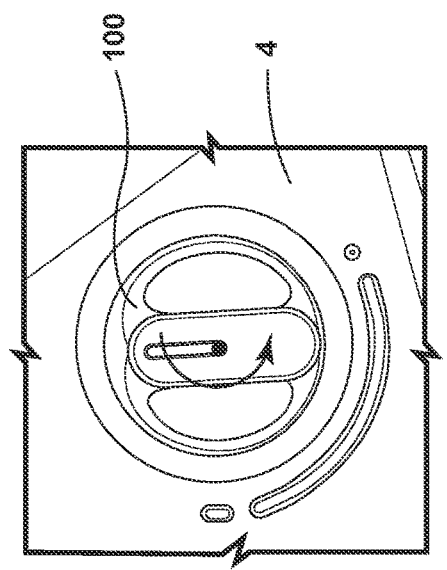
FIG. 8
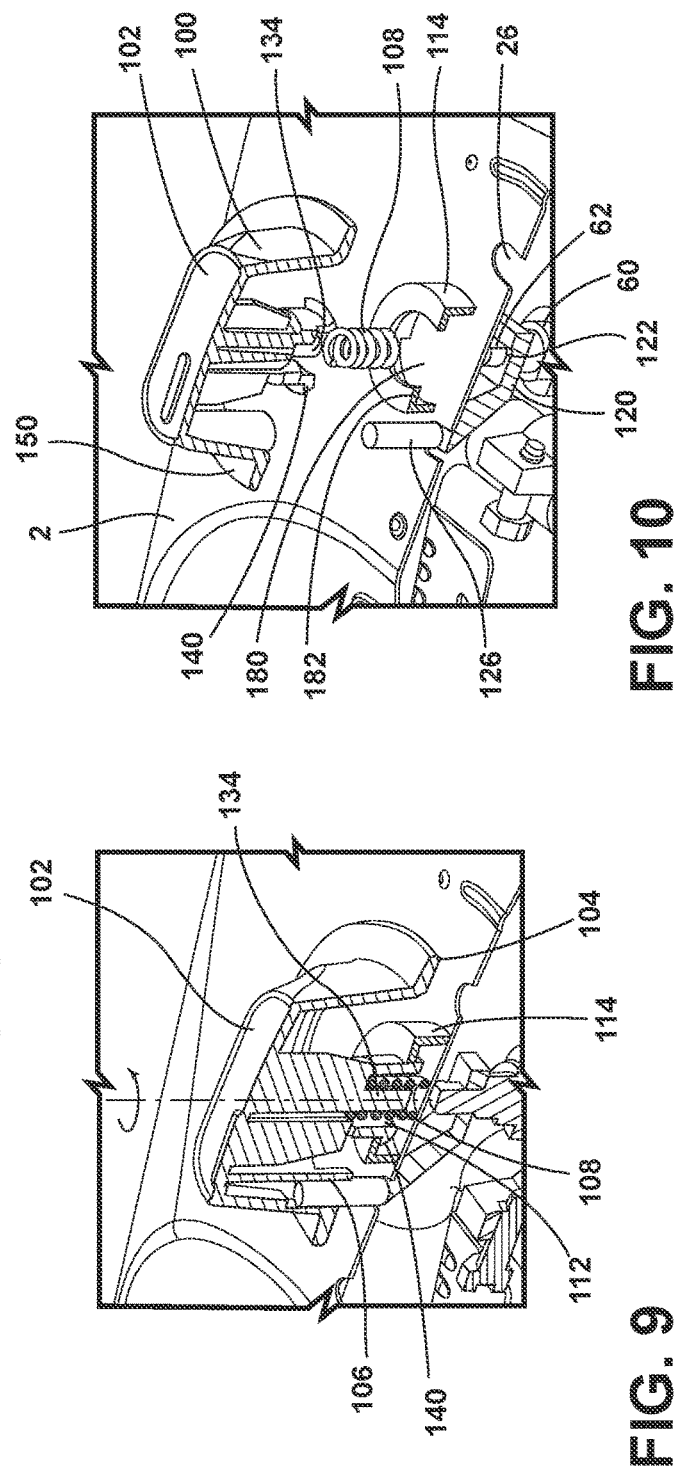
FIG. 9
FIG. 10

ECCENTRIC KNOB ASSEMBLY FOR GAS APPLIANCES

BACKGROUND OF THE DISCLOSURE

The present disclosure generally relates to a cooking appliance, and more specifically, to an eccentric knob assembly for gas appliances. Water, cleaning products, fluids, food, and other contaminants can potentially enter the gas valve shaft that is connected to an actuating knob positioned directly above the shaft. These contaminants can: damage the seals between the gas valve shaft and gas valve body; dry internal valve body lubricants; create gas leaks; obstruct gas flow; etc. Thus, displacing the rotation point of the gas valve shaft from the opening in the gas appliance would potentially avoid any entrance of contaminants directly onto the valve shaft and/or valve body.

SUMMARY OF THE DISCLOSURE

According to one aspect of the present disclosure is a knob assembly for a gas appliance. The gas appliance has a gas valve that is positioned below a surface of the appliance. The surface has an arcuate opening. An actuator is coupled to the gas valve. The actuator has a pin that is positioned in the arcuate opening. A knob is coupled to the pin.

According to another aspect of the present disclosure is a gas appliance with a knob assembly. The gas appliance has a gas valve positioned below a cooking surface of the appliance. The cooking surface has an arcuate opening. The knob assembly has an actuator that is coupled to the gas valve. The actuator has a pin that is positioned in the arcuate opening with a portion of the pin extending above the cooking surface. A knob is coupled to the pin of the actuator.

According to yet another aspect of the present disclosure is a knob assembly for a gas valve in an appliance. The appliance has a gas valve positioned below the cooking surface of the appliance. The cooking surface has an arcuate opening that is spaced away from the gas valve. An actuator is coupled to the gas valve. The actuator has a pin that is positioned in the arcuate opening. A knob is coupled to the actuator pin. The knob has a lower flange that extends over the arcuate opening.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 8 is a top view of another embodiment of a knob assembly;

FIG. 9 is a partial perspective cross-sectional view of the knob assembly of FIG. 8 installed in a gas appliance; and FIG. 10 is a partial perspective side cross-sectional view showing the components of the knob assembly shown in FIG. 9.

Figure 2:
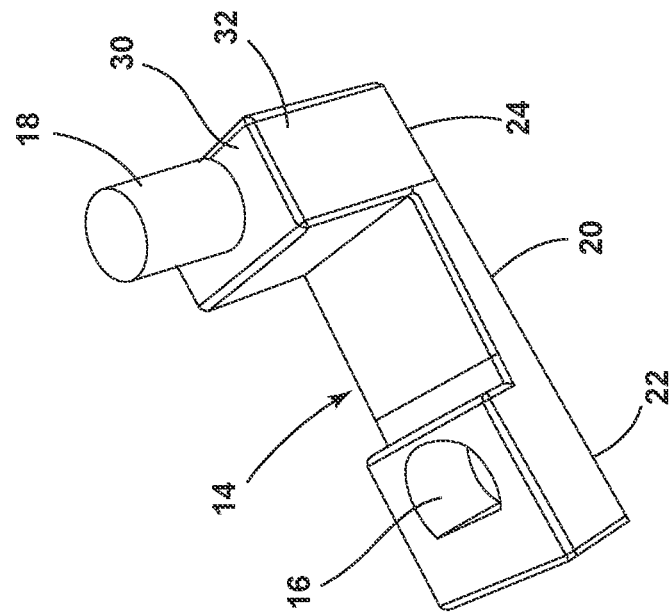
FIG. 2 illustrates a top perspective view of an actuator.

The components in the figures are not necessarily to scale, emphasis instead being placed upon illustrating the principles described herein.

DETAILED DESCRIPTION

The present illustrated embodiments reside primarily in combinations of method steps and apparatus components related to a deflector for a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
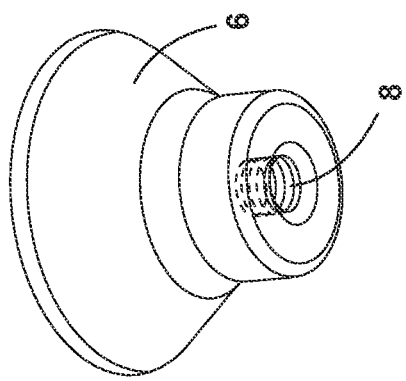
FIG. 1 illustrates top and bottom perspective views of a knob.
Figure 1:
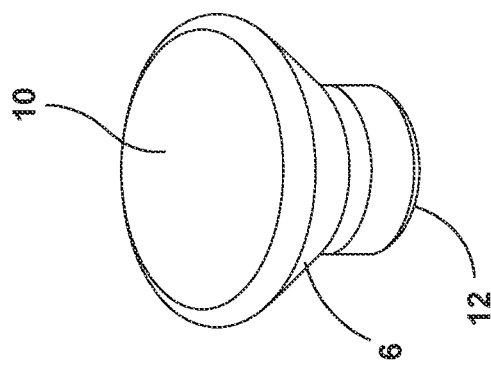

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 5:
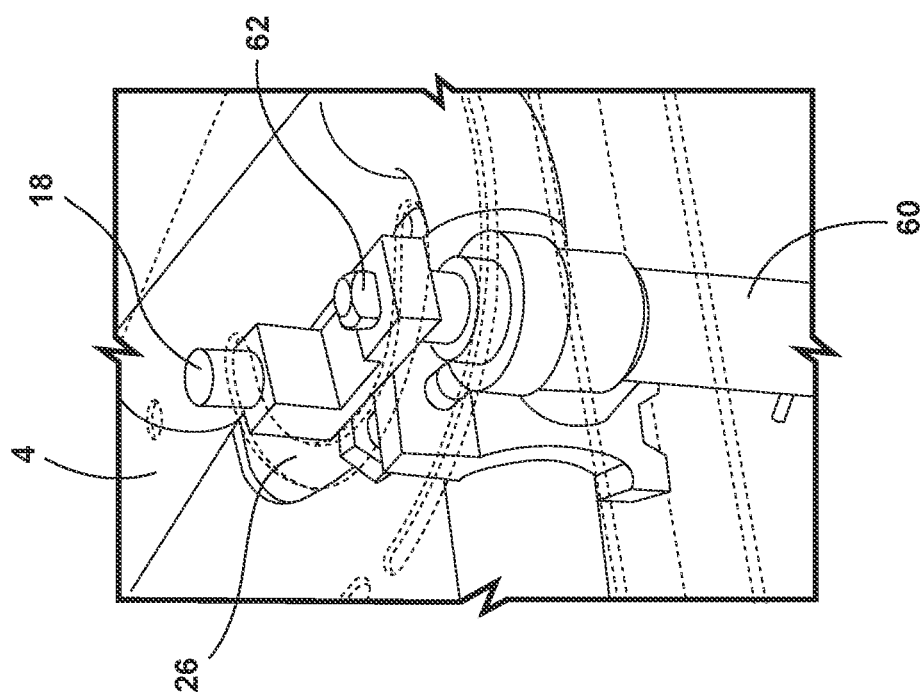
FIG. 5 is a partial top view of a gas appliance with the knob assembly.
Figure 7:
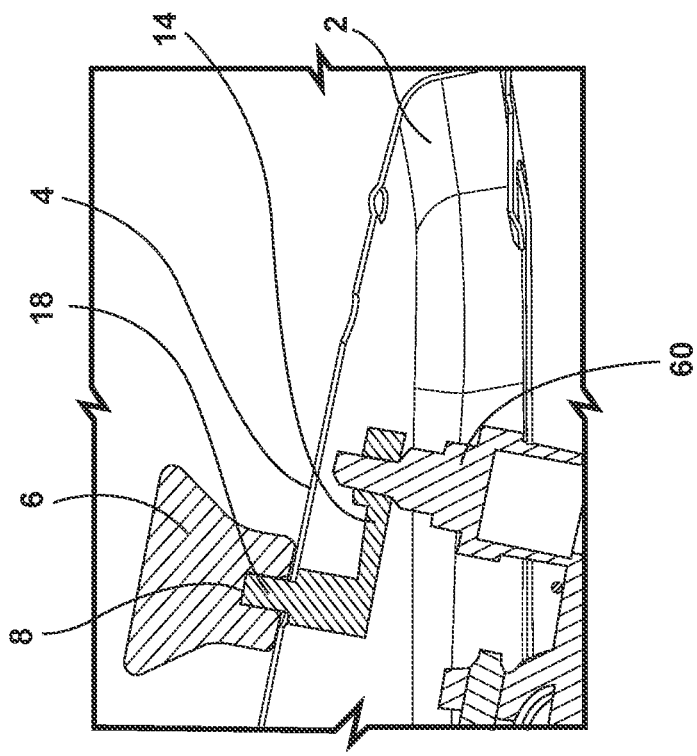
FIG. 7 is a partial side cross-sectional view of the knob assembly coupled to a gas appliance with the knob in a locked position.
Figure 6:
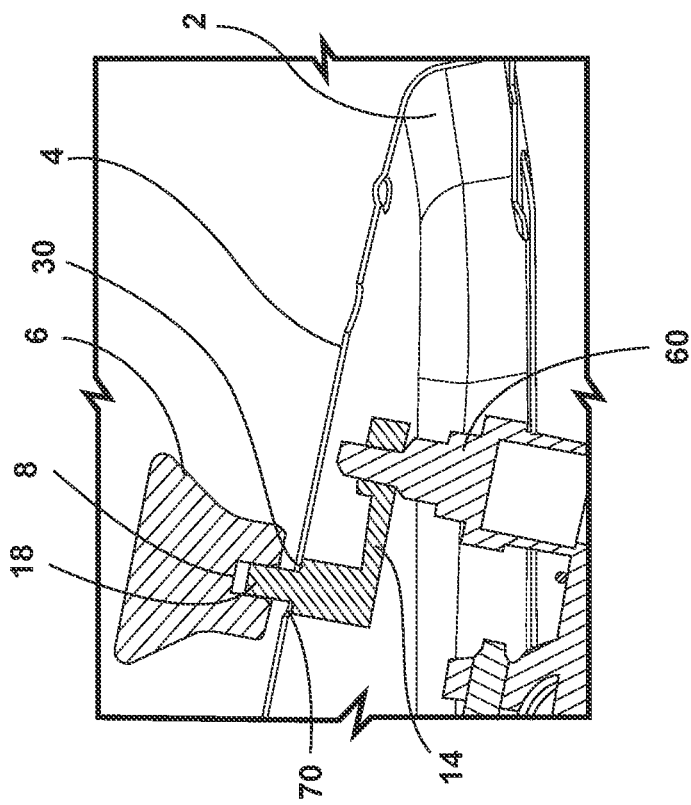
FIG. 6 is a partial side cross-sectional view of the knob assembly coupled to a gas appliance with the knob in an unlocked position.

Referring to FIGS. 5-7, reference numeral 2 generally denotes an appliance. The appliance 2 can be a free-standing or built-in appliance. The appliance 2 has at least one gas cooking element 200. In the illustrated embodiment, the cooking element 200 is a gas burner.

The appliance 2 has a cooking surface 4. The gas cooking element 200 can be positioned on, above, or below the cooking surface 4. A gas valve 60 is positioned on the appliance 2 below cooking surface 4. The gas valve 60 has a shaft (stem) 62 that can be rotated to open or close the flow of gas from the gas valve 60 to the gas cooking element 200.

An actuator 14 is coupled to the gas valve 60. In the illustrated embodiment shown in FIGS. 2-7, the actuator 14 has a first end 22, a second end 24, and a medial section 20 therebetween. The first end 22 has an opening 16 shaped to be received around a portion of the stem 62 of gas valve 60. The second end 24 includes a ledge 32. A pin 18 extends from the top surface 30 of the ledge 32. The pin 18 can have a threaded section (not shown). The ledge 32 can be positioned adjacent to and can contact a lower surface 70 of the cooking surface 4.

Figure 3:
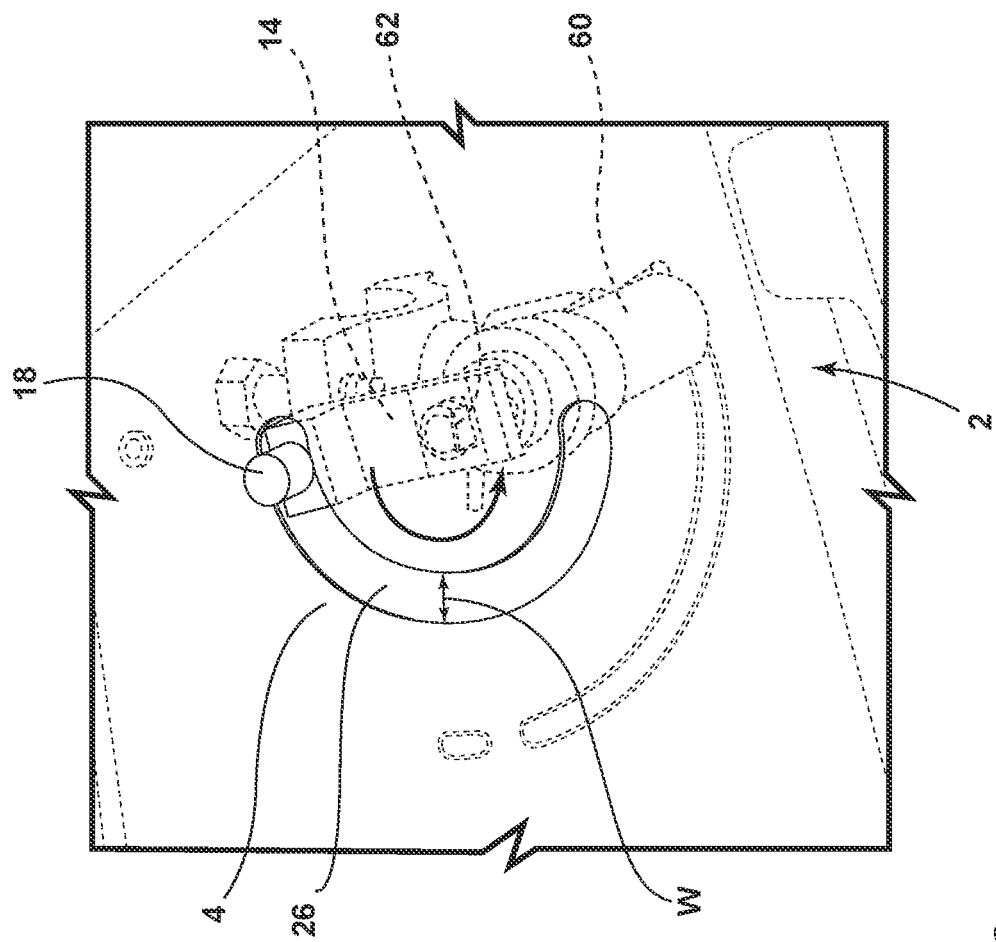
FIG. 3 is a partial top perspective view of the actuator shown in FIG. 2 installed in a gas appliance.
Figure 4:
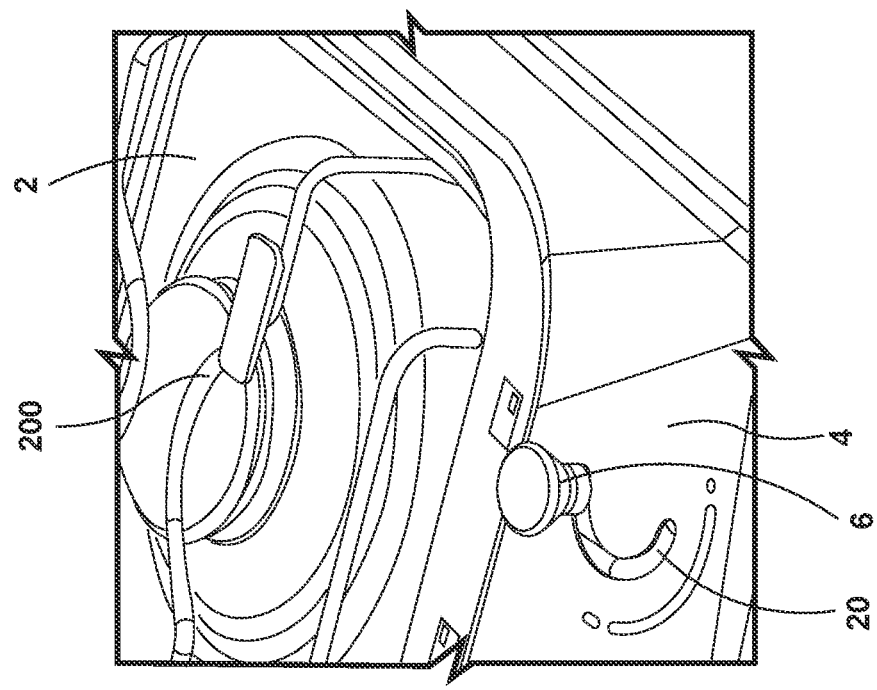
FIG. 4 is a partial bottom perspective view of the actuator shown in FIGS. 2 and 3 installed in a gas appliance.

The knob 6 has a top surface 10 and a bottom surface 12. A pin opening 8 is in the bottom surface 12. The pin opening 8 can have a threaded section. The pin opening 8 is coupled to the pin 18 of the actuator 14. The pin 18 is received in an arcuate opening 26 in the cooking surface 4. As illustrated in FIGS. 3-7, the arcuate opening 26 is spaced away from the stem 62 of the gas valve 60. The pin 18 can extend above the cooking surface 4, as shown in FIGS. 3-7. The width W of arcuate opening 26 should be slightly larger than the diameter of the pin 18. The pin 18 can move through the arcuate opening 26 by movement of the knob 6. FIG. 3 illustrates the direction of movement of the pin 18 within arcuate opening 26. The arcuate opening 26 could be of any arcuate length provided that it can open and fully close the gas valve 60 by suitable rotation of the stem 62. In the illustrated embodiment, the arcuate opening 26 is an arc that is approximately half of a circle.

While the illustrated embodiment shown in FIGS. 3-7 has the arcuate opening 26 entirely open, a sealing member (not shown) can be positioned above or below the cooking surface 4. Such a sealing member can move with the movement of pin 18 so that the arcuate opening 26 can be sealed.

The knob 6 can be locked against the cooking surface 4 as shown in FIG. 7. This can be accomplished by compressing the knob 6 or, if threading is used in opening 8 and on pin 18, by advancing the knob 6 down pin 18 until it is locked against the cooking surface 4.

Another embodiment of a knob 100 is shown in FIGS. 8-10. the knob 100 includes a top surface 102 and a bottom surface 104. The bottom surface 104 includes a flange 150. The knob 100 has a pin opening 106, a spring member locator 134, and one or more teeth 140. The teeth 140 can extend from spaced apart members with longitudinal slots in between the members such that that the teeth 140 are flexible.

The knob 100 is coupled to a central hub 114. The central hub 114 is positioned on the cooking surface 4 above the stem 62 of the gas valve 60. The central hub 114 can be coupled to the cooking surface 4. The teeth 140 from the knob 100 are received in an opening 180 in the central hub 114. The teeth 140 contact a surface 182 of the central hub 114.

A spring member 108 is positioned around the spring member locator 134. The spring member 108 may be coupled to the cooking surface 4. The spring member 108 assists in maintaining the knob 100 positioned above the stem 62 of the gas valve 60. The teeth 140 can be positioned around the spring member 108, creating a spring opening 112.

An actuator 120 includes an opening 122 that is coupled to the stem 62 of gas valve 60. The actuator 120 also has a pin 126 that extends through the arcuate opening 26 in cooking surface 4 of appliance 2, as shown in FIG. 10. The pin 126 is received in the pin opening 106 of knob 100.

The flange section 150 of knob 100 extends over and/or past the arcuate opening 26. Thus, when knob 100 is rotated to activate the gas valve 60, the arcuate opening 26 remains covered by the knob 100 and the central axis of the knob 100 remains above the central axis of the stem 62 of the gas valve 60.

The knobs (6, 100) can be made of a metal material, polymeric material, ceramic material, or combination thereof. Similarly, the actuator (14, 120) can be made of a similar material.

The invention disclosed herein is further summarized in the following paragraphs and is further characterized by combinations of any and all of the various aspects described therein.

According to another aspect of the present disclosure, is a knob assembly for a gas appliance. The gas appliance has a gas valve that is positioned below a surface of the appliance. The surface has an arcuate opening. An actuator is coupled to the gas valve. The actuator has a pin that is positioned in the arcuate opening. A knob is coupled to the pin.

According to another aspect of the present disclosure, the arcuate opening is slightly larger than the diameter of said pin.

According to another aspect of the present disclosure, the arcuate opening is in the shape of a half circle.

According to another aspect of the present disclosure, the pin extends from a raised ledge on the actuator.

According to another aspect of the present disclosure, the top surface of the raised ledge has a width that is wider than the diameter of the pin.

According to another aspect of the present disclosure, the top surface of the raised ledge is adjacent to a lower surface of the arcuate opening.

According to another aspect of the present disclosure, the knob is compressed against the surface to prevent movement of the knob.

According to another aspect of the present disclosure is a gas appliance with a knob assembly. The gas appliance has a gas valve positioned below a cooking surface of the appliance. The cooking surface has an arcuate opening. The knob assembly has an actuator that is coupled to the gas valve. The actuator has a pin that is positioned in the arcuate opening with a portion of the pin extending above the cooking surface. A knob is coupled to the pin of the actuator.

According to another aspect of the present disclosure, the arcuate opening is slightly larger than the diameter of the pin.

According to another aspect of the present disclosure, the pin extends from a raised ledge on the actuator.

According to another aspect of the present disclosure, the top surface of the raised ledge has a width that is larger than the width of the arcuate opening.

According to another aspect of the present disclosure, the top surface of the raised ledge is adjacent to a lower surface of the cooking surface.

According to yet another aspect of the present disclosure is a knob assembly for a gas valve in an appliance. The appliance has a gas valve positioned below the cooking surface of the appliance. The cooking surface has an arcuate opening that is spaced away from the gas valve. An actuator is coupled to the gas valve. The actuator has a pin that is positioned in the arcuate opening. A knob is coupled to the actuator pin. The knob has a lower flange that extends over the arcuate opening.

According to another aspect of the present disclosure, a central hub member is positioned on the cooking surface above the gas valve, the central hub member coupled to the knob.

According to another aspect of the present disclosure, the knob has one or more teeth that contact a surface of the central hub member.

According to another aspect of the present disclosure, a spring member couples to a portion of the knob.

According to another aspect of the present disclosure, the pin extends above the surface.

According to another aspect of the present disclosure, the lower flange of the knob contacts the upper surface of the cooking surface.

According to another aspect of the present disclosure, the control hub member is coupled to the cooking surface.

According to another aspect of the present disclosure, the one or more teeth of the knob surround a portion of the spring member.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A knob assembly for a gas appliance, comprising:
   a gas valve with a stem positioned below a solid section of a surface of the appliance;
   an arcuate opening in said surface spaced away from said gas valve;
   an actuator having an opening coupled to the stem of said gas valve underneath said solid section and a pin that is positioned in said arcuate opening; and
   a knob coupled to said pin.

2. The knob assembly of claim 1, wherein said arcuate opening is larger than the diameter of said pin.

3. The knob assembly of claim 2, wherein said arcuate opening is in the shape of a half circle.

4. The knob assembly of claim 1, wherein said pin extends from a raised ledge on said actuator.

5. The knob assembly of claim 4, wherein the top surface of said raised ledge has a width that is longer than the diameter of said pin.

6. The knob assembly of claim 5, wherein the top surface of said raised ledge is adjacent to a lower surface of said arcuate opening.

7. The knob assembly of claim 1, wherein said knob is compressed against said surface to prevent movement of said knob.

8. The gas appliance of claim 1, wherein said pin extends from a raised ledge on said actuator.

9. The gas appliance of claim 8, wherein the top surface of said raised ledge has a width that is larger than the width of said arcuate opening.

10. The gas appliance of claim 9, wherein the top surface of said raised ledge is adjacent to a lower surface of said cooking surface.

11. A gas appliance having a knob assembly, comprising:
    a gas appliance having a gas valve with a stem positioned below a solid section of a cooking surface of said appliance;
    an arcuate opening in said cooking surface;
    an actuator coupled to said gas valve, said actuator having a pin that is positioned in said arcuate opening with a portion of the pin extending above said cooking surface; and
    a knob coupled to said pin.

12. The gas appliance of claim 11, wherein said arcuate opening is larger than the diameter of said pin.

13. A knob assembly for a gas valve on an appliance, comprising:
    a gas valve positioned below a cooking surface of the appliance;
    an arcuate opening in said cooking surface spaced away from said gas valve;
    an actuator coupled to said gas valve having a pin that is positioned in said arcuate opening;
    a knob coupled to said pin, said knob having a lower flange that extends over said arcuate opening; and
    a central hub member positioned on said cooking surface above said gas valve, said central hub member coupled to said knob.

14. The knob assembly of claim 13, wherein said knob has one or more teeth that contact a surface of said central hub member.

15. The knob assembly of claim 14, including a spring member that couples to a portion of said knob.

16. The knob assembly of claim 14, wherein said one or more teeth surround a portion of said spring member.

17. The knob assembly of claim 13, wherein said pin extends above said cooking surface.

18. The knob assembly of claim 13, wherein said lower flange of said knob contacts the upper surface of said cooking surface.

19. The knob assembly of claim 13, wherein said central hub member is coupled to said cooking surface.

\* \* \* \* \*